United States Patent [19]

Psajd

[11] Patent Number: 5,116,086

[45] Date of Patent: May 26, 1992

[54] QUICK ACTION COUPLING

[75] Inventor: Rihard Psajd, Värnamo, Sweden

[73] Assignee: Ezze AB, Sweden

[21] Appl. No.: 584,627

[22] Filed: Sep. 19, 1990

[30] Foreign Application Priority Data

Sep. 19, 1989 [SE] Sweden ................. 8903072

[51] Int. Cl.⁵ .............................. F16L 27/12
[52] U.S. Cl. ...................... 285/277; 285/315; 285/316
[58] Field of Search ............ 285/316, 315, 277

[56] References Cited

U.S. PATENT DOCUMENTS

| | | |
|---|---|---|
| 1,873,914 | 8/1932 | Adams . |
| 2,463,253 | 3/1949 | Earle et al. .................. 285/277 |
| 2,744,770 | 5/1956 | Davidson et al. . |
| 3,076,671 | 2/1963 | Freeman ..................... 285/277 |
| 3,112,767 | 12/1963 | Cator ..................... 285/277 X |
| 4,060,219 | 11/1977 | Crawford .................. 285/316 X |

FOREIGN PATENT DOCUMENTS

| | | | |
|---|---|---|---|
| 651738 | 11/1962 | Canada ................. | 285/277 |
| 519882 | 3/1955 | Italy ..................... | 285/277 |
| 587237 | 1/1959 | Italy ..................... | 285/316 |

Primary Examiner—Randolph A. Reese
Assistant Examiner—Heather Chun
Attorney, Agent, or Firm—Pollock, Vande Sande & Priddy

[57] ABSTRACT

A quick action coupling including a coupling body and a coupling nipple connectable with either of a pair of hoses or the like, the coupling body comprising a coupling sleeve in which the coupling nipple is introducible to a sealing position. In the wall of the coupling sleeve there are formed radially extending, through openings in which locking balls are radially movable. At the outer surface of the coupling sleeve there is provided a locking sleeve which is axially movable to lock and release the locking balls. The through openings in which the locking balls are positioned are slot-shaped to allow that the locking balls are displaced away from the position in which they are locked by the locking sleeve without requiring manipulation of the locking sleeve.

4 Claims, 3 Drawing Sheets

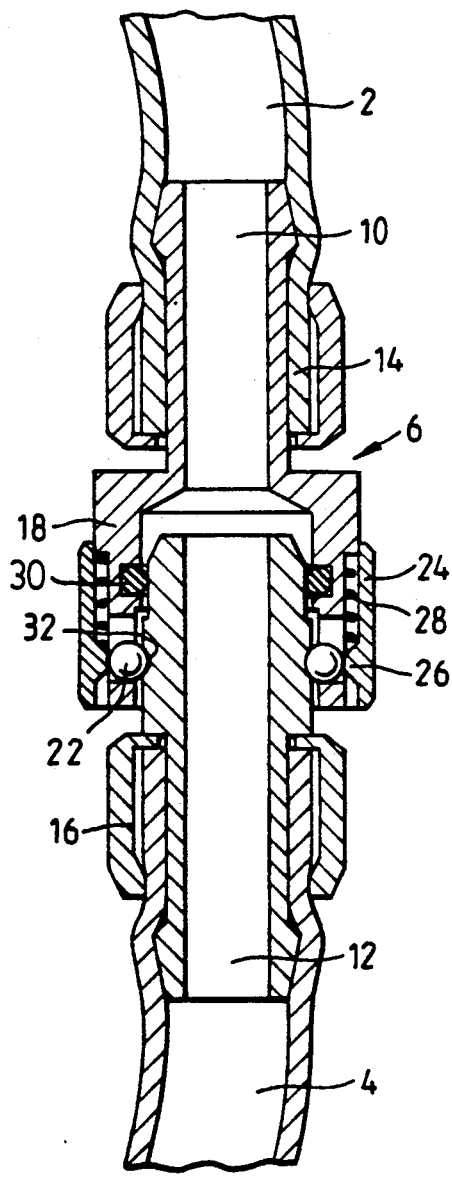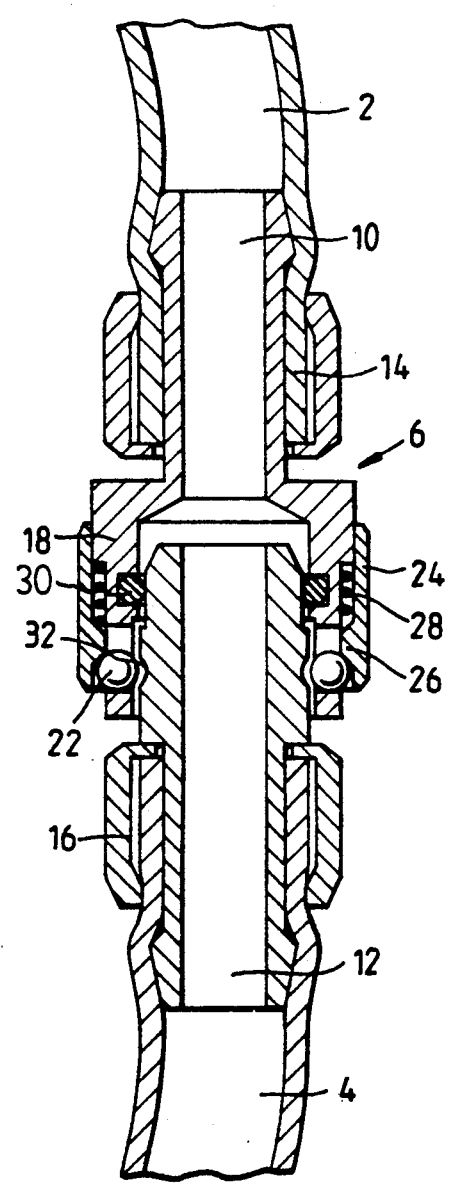

QUICK ACTION COUPLING

FIELD OF THE INVENTION

The present invention relates to a quick action coupling including two coupling members each connectable with either of a pair of hoses or the like.

BACKGROUND ART

A prior art quick action coupling of this kind includes a coupling body and a coupling nipple, the coupling body comprising a coupling sleeve in which the coupling nipple is introducable to a sealing position. The wall of the coupling nipple is formed with radially extending through opening in which locking balls are radially movable between a locking position and a releasing position. In the locking position the balls project inside the inner surface of the wall of the coupling sleeve, and when the coupling nipple takes it sealing position in the coupling sleeve the locking balls engage a complementary recess in the coupling nipple so as to lock the nipple in the sealing position. In the releasing position the locking balls are positioned radially outside the locking position in which the balls engage the recess of the coupling nipple so as to allow that the coupling nipple is introduced into and withdrawn from the coupling sleeve. A locking sleeve is provided at the outer surface of the wall of the coupling sleeve and is axially displaceable between a locking position in which an inner locking surface of the locking sleeve engages the locking balls so as to retain the balls in the locking position, and a position in which the locking surface of the locking sleeve is at a distance from the locking balls so as to allow the balls to move radially outwards to the releasing position.

In this prior art quick action coupling it is necessary to manually displace the locking sleeve to the position in which the locking surface of the locking sleeve is at a distance from the locking balls, when the coupling nipple is introduced into the coupling sleeve as well as when the coupling nipple is withdrawn therefrom. Especially at the introduction of the coupling nipple into the coupling sleeve this is a substantial drawback as it is necessary concurrently to manipulate the coupling sleeve as well as to position the coupling nipple opposite to the opening of the coupling sleeve which is difficult to conduct by means of one hand and often requires that both hands are used.

In order to overcome this drawback and provide a quick action coupling in which the coupling nipple can be introduced into the coupling sleeve without manipulation of the locking sleeve it has been suggested to form the through openings of the coupling sleeve as slot-shaped openings. Thereby the slot-shaped openings extend in the longitudinal direction of the coupling sleeve and are of such extension in relation to the extension of the locking surface of the locking sleeve that the balls are adapted at the introduction of the coupling nipple into the coupling sleeve, while being affected by the nipple, and without axial displacement of the locking sleeve, to be displaced in the longitudinal direction of the slot-shaped openings away from an engagement with the locking surface of the locking sleeve, so as to allow the introduction of the nipple into the position in which the locking balls engage the recess of the nipple. The locking balls and also the locking sleeve are spring loaded towards the locking position.

In a quick action coupling of this kind the connection of the coupling body with the coupling nipple is simply conducted by forcing the coupling nipple into the coupling sleeve, the locking balls being thereby displaced in the slot-shaped openings to the position in which the balls are radially outside the locking position in which the balls engage the recess of the coupling nipple, while the locking balls move into the recess to take the locking position when the nipple has arrived to the position in which the recess of the nipple is opposite to the balls, and thereby the connection between the coupling nipple and the coupling sleeve has been completed.

A drawback of these prior art quick action couplings of this kind is that they are of a complicated construction for which reason they are costly and inclined to functional disorders.

SUMMARY OF THE INVENTION

The object of the present invention is to overcome the drawback and to provide a quick action coupling of the kind set forth which is of a simple construction and thereby is more economic and reliable.

In order to achieve this object the quick action coupling according to the invention is characterized in that the locking balls and the locking sleeve are loaded by means of the same spring.

It is preferred that the locking balls and the locking sleeve are spring-loaded towards their locking positions by means of a support ring engaging the locking balls and the locking sleeve and loaded by the spring and that the support ring is axially displaceable in relation to the coupling sleeve while sliding along cylindrical engagement surfaces having at least two different diameters. Preferably the support ring is constituted by a cylindrical wall having at one edge a radially thickened portion forming a peripheral projection extending radially inwards and a peripheral projection extending radially outwards, the projection extending radially inwards engaging the locking balls and forming one of the cylindrical engagement surfaces and the projection extending radially outwards engaging the locking sleeve and forming an engagement surface for the spring.

The present invention is described in the following in more detail with reference to the accompanying drawings.

BRIEF DESCRIPTION OF THE DRAWINGS

FIG. 3 is a section corresponding to FIGS. 1 and 2 after the coupling members have been assembled.

FIG. 4 is a section corresponding to FIGS. 1-3 in a position in which the coupling members are disassemblable.

FIG. 5 is a section of a detail of a modified embodiment of a quick action coupling according to the present invention.

DETAILED DESCRIPTION OF THE PREFERRED EMBODIMENT

Figure 1:
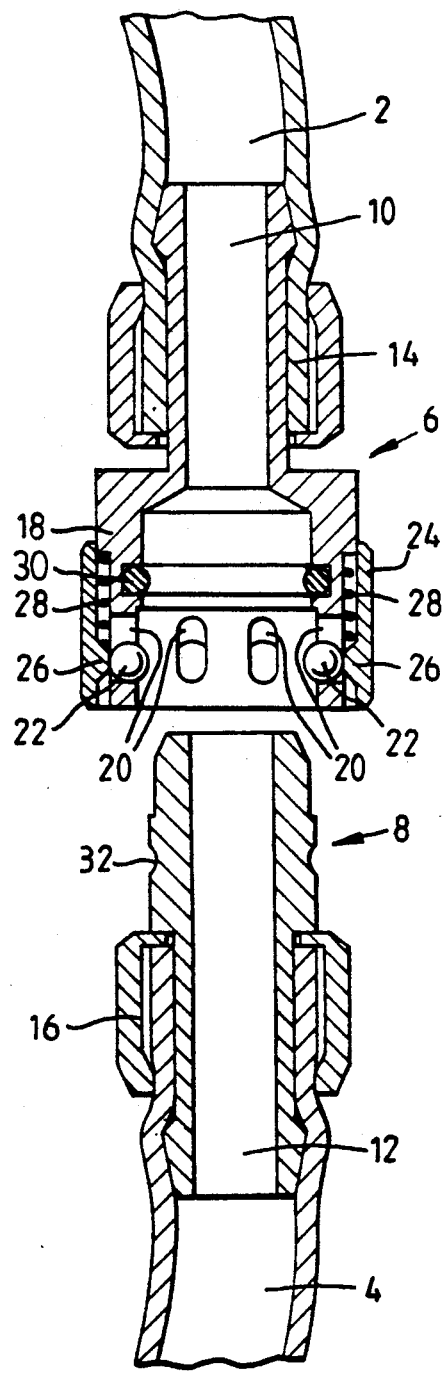
FIG. 1 is an axial section of an embodiment of a quick action coupling according to the invention prior the connection of the member of the couplings with each other.

The quick action coupling according to the present invention and shown in FIG. 1–4 is intended for connecting a hose 2 with a hose 4. The quick action coupling comprises two coupling members, namely a coupling body 6 and a coupling nipple 8. The coupling members 6 and 8 each have a connection piece 10 and 12, respectively, to which the hoses 2 and 4 are connected by means of hose locks 14 and 16.

The coupling body 6 comprises a coupling sleeve 18 of a substantially cylindrical shape. In the wall of the coupling sleeve 18 there are provided a number of openings 20 extending radially through the wall. In each opening 20 there is positioned a locking ball 22, and the openings 20 are so formed in relation to the locking balls 22 that the locking balls 20 are displaceable radially as well as axially. The radial movement takes place between an inner locking position in which the balls extend somewhat inside the inner surface of the coupling sleeve 18 and an outer releasing position in which the balls are positioned substantially outside the inner surface of the coupling sleeve 18.

At the outer surface of the coupling sleeve 18 there is provided a locking sleeve 24 having an inwardly directed, annular locking surface 26 adapted to cooperate with the locking balls. Between the outer surface of the coupling sleeve 18 and the inner surface of the locking sleeve 24 there is provided a helical spring 28 by means of which the locking balls 22 as well as the locking sleeve 24 are loaded in a direction downwards int eh figures, that is towards the position taken by the locking balls 22 and the locking sleeve 24 in, for example, FIG. 1. It appears that the locking balls 22 are in this position locked, by the locking surface 26 of the locking sleeve 24, in their locking position in which the balls extend inside the inner surface of the coupling sleeve 18. It is realized that a position in which the locking balls 22 can be displaced radially outwards to the releasing position in which the locking balls are substantially outside the inner surface of the coupling sleeve 18 can be achieved in two ways. It can be done either by displacing the balls 22 upwardly in the slot-shaped openings 20 to a position above the locking surface 26 of the locking sleeve 24 or by displacing the locking sleeve 24 upwardly to a position in which the locking surface 26 is positioned above the locking balls 22. The displacement of the locking balls 22 as well as the displacement of the locking sleeve 24 take place against the action of the spring 28.

In the coupling sleeve 18 there is positioned an O-ring 30 adapted to seal the coupling sleeve 18 in relation to the coupling nipple 8 introduced into the coupling sleeve. The coupling nipple 8 has an outer diameter which substantially corresponds to the inner diameter of the coupling sleeve 18 and allows for introducing the coupling nipple 98 into the coupling sleeve 18. The coupling nipple 8 has a recess formed as an annular groove 32 having a cross section which is arc-shaped or the like. The balls 22 are adapted to engage this groove 32 when the nipple 8 has been introduced into the coupling sleeve 18.

Figure 2:
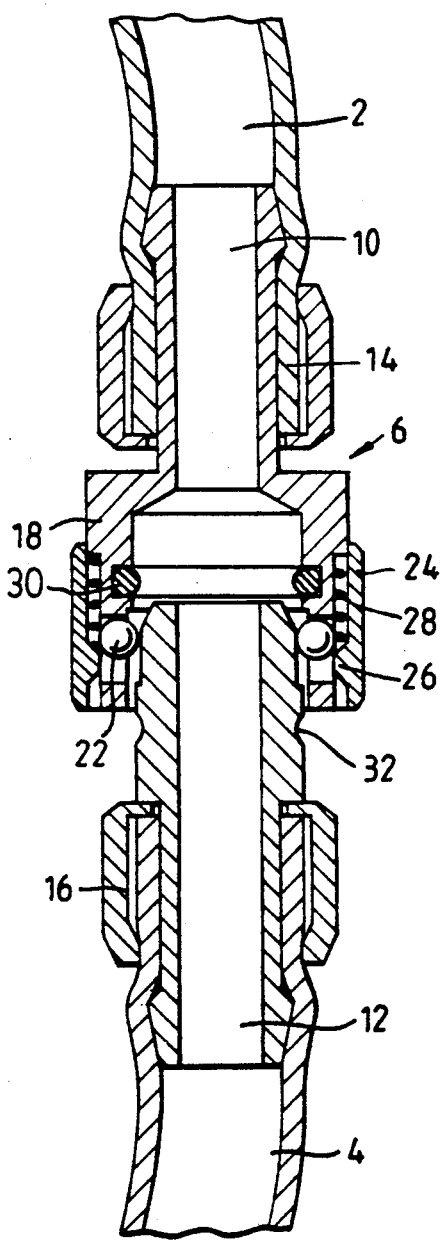
FIG. 2 is a section corresponding to FIG. 1 during the assembling of the coupling members.

FIG. 2 illustrates the introduction of the coupling nipple 8 into the coupling sleeve 18. It appears that the coupling nipple 8 displaces the locking balls 22 in the slot-shaped openings 20 upwardly against the action of the spring 28, when the nipple is introduced into the coupling sleeve 18, the locking balls 22 being thereby displaced away from the engagement with the locking surface 26 of the locking sleeve 24. When the locking balls 22 leave their engagement with the locking surface 26 they can, as described above, more radially outwards to a position in which they are outside the inner surface of the coupling sleeve 18 and thereby do not obstruct the introduction of the coupling nipple 8.

When the coupling nipple 8 has been introduced into the position shown in FIG. 3, wherein the coupling nipple 8 sealingly engages the O-ring 30 in the coupling sleeve 18 and the locking balls 22 are positioned opposite to the groove 32 in the coupling nipple 8, the locking balls 22 can be returned to the position shown in FIG. 1 by the spring 28, the locking balls 22 thereby engaging the groove 32 and locking the coupling nipple 8 with regard to withdrawal from he coupling sleeve 18.

Thus, it appears that the connection of the coupling nipple 8 with the coupling body 6 is conducted by one simple manipulation by introducing the coupling nipple 8 into the coupling sleeve 18. There is not required any additional manipulation of the quick action coupling to provide the desired connection of the hoses 2 and 4 with each other.

When the coupling nipple 8 is withdrawn from the coupling body 6, the locking sleeve 24 is, as shown in FIG. 4, displaced upwardly against the action of the spring 28 to the position, in which the locking surface 26 is positioned above the locking balls 22. In this position the coupling nipple 8 can be withdrawn from the coupling sleeve 18, the balls being thereby displaced radially outwards to a position in which the balls are outside the inner surface of the coupling sleeve 18, when the coupling nipple is withdrawn. Thereby the engagement of the locking balls 22 in the groove 32 is ceased and the coupling nipple 8 can without obstruction be withdrawn from the coupling sleeve 18. When the locking sleeve 24 is then released, the spring 28 returns the locking sleeve 24 to the position shown in FIG. 1 which has thus been reestablished.

Figure 5:
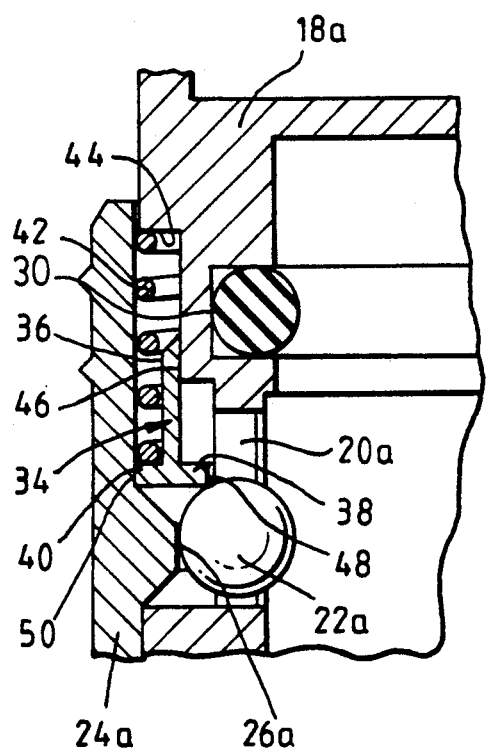
FIG. 5 is a section corresponding to FIGS. 1-3 in a position in which the coupling members are disassemblable.

In FIG. 5 there is shown a section of a portion of a modified embodiment of the quick action coupling according to the invention. Also this embodiment of the quick action coupling is intended for connecting two hoses with each other and comprises two coupling members, a coupling body and a coupling nipple. In FIG. 5 there is shown a portion of the coupling body of the quick action coupling, the coupling nipple of the embodiment according to FIG. 5 being of the same design as the coupling nipple according to FIGS. 1–4.

The coupling body of the embodiment according to FIG. 5 comprises a coupling sleeve 18a of a substantially cylindrical shape. In the wall of the coupling sleeve 18a there are provided a number of openings 20a extending radially through the wall. In each opening 20a there is arranged a locking ball 22a, and the openings 20a are formed in relation to the locking balls 22a, such that the locking balls 22a are displaceable radially as well as axially. Thus, so far there is a complete correspondence between the embodiment according to FIGS. 1–4 and the embodiment according to FIG. 5. In the embodiment according to FIG. 5 there is a locking sleeve 24a positioned at the outer surface of the coupling sleeve 18a and having an inwardly directed, annular locking surface 26a adapted to cooperate with the locking balls.

Between the outer surface of the coupling sleeve 18a and the inner surface of the locking sleeve 24a there is provided a support ring 34 consisting of a cylindrical wall 36 having at one edge a radially thickened portion forming a radially inwards directed, annular projection 38 and a radially outwards directed, annular projection 40.

The support ring 34 is engaged by a helical spring 42 which is tensioned between the outwardly extending projection 40 on the support ring 34 and an opposite surface 44 on the coupling sleeve 18a. Thus, the spring 42 acts for displacing the support ring 34 downwards according to FIG. 5. The force of the spring 42 is transferred to the locking balls 22a and the locking sleeve 24a through the support ring 34 by the engagement of the inwardly directed projection 38 with the locking balls 22a and the engagement of the outwardly directed projection 40 with the locking sleeve 24a. Thus, the locking balls 22a are like the balls of the embodiment according to FIGS. 1-4 spring-loaded in the direction of the locking position and the locking sleeve 24a is also spring-loaded in the direction of the locking position.

The support ring 34 is axially displaceable in relation to the coupling sleeve 18a and the locking sleeve 24a along cylindrical sliding surfaces 46, 48 and 50. Because of the fact that the support ring 34 and the coupling sleeve 18a engage each other along the sliding surfaces 46 and 48 which have different diameters the support ring is prevented from harshing and there is provided a guarantee for a secure operation of the balls as well as the locking sleeve.

It is realized that otherwise this embodiment of the quick action coupling according to the invention has the same function as the quick action coupling according to FIGS. 1-4 and that the difference with respect to the embodiment according to FIGS. 1-4 is in all essentials represented only by the existence of the support ring 34.

I claim:

1. A quick action coupling comprising:
   a coupling body and a coupling nipple, each connectable with either of a pair of hoses; said coupling body including a coupling sleeve adapted for receiving said coupling nipple therein, said coupling sleeve being provided with slot-shaped through openings radially extending through the wall thereof and having a predetermined length in the longitudinal direction of said coupling sleeve,
   locking balls positioned in said openings and radially movable between (a) an inner locking position in which said balls extend substantially inside the inner surface of the wall of said coupling sleeve and each engage a recess in said coupling nipple so as to lock said nipple in the sealing position in said coupling sleeve and (b) an outer releasing position in which said balls extend into said slot-shaped openings beyond the inner surface of said coupling sleeve to facilitate insertion and withdrawal of said nipple into and from said coupling body;
   a locking sleeve inserted over the outer surface of said coupling sleeve and having an inwardly extending annular locking surface adapted to cooperate with said locking balls, said locking sleeve being axially movable along said outer surface of said coupling sleeve between a first locking position in which said locking surface engages said locking balls and a second position in which said locking surface is at a distance from said locking balls allowing for their radially outward movement into said releasing position in said slot-shaped openings,
   wherein said predetermined length of said slot-shaped openings is so selected with respect to said annular locking surface of said locking sleeve such that an insertion of said nipple into said coupling body effects axial displacement of said balls within said openings away from an engagement with said locking surface without axial displacement of said locking sleeve,
   a support ring including a first portion and a second, base portion defining a radially inwardly projecting annular part and a radially outwardly projecting annular part, said support ring being provided in a space formed between said coupling sleeve and said locking sleeve; said support ring being axially displaceable with respect to said coupling sleeve by sliding along at least two sliding engagement surfaces of said ring having different diameters, one of said sliding surfaces being defined by an inner surface of said first portion and said second sliding surface being defined by an inner edge surface of said inwardly projecting annular part, said first and second sliding surfaces being in guiding engagement with said coupling body, and
   a common spring means positioned also in said space and confined between said outwardly projecting part and a surface of said coupling sleeve for influencing said locking balls and said locking sleeve through said support ring towards their locking position.

2. A quick action coupling according to claim 1, wherein said first portion of said support ring includes a cylindrical wall and said base portion includes a flange located at the bottom edge of said first position to form said inwardly and outwardly projecting parts.

3. A quick action coupling according to claim 1, wherein an upper surface of said outwardly extending projection defines an engagement surface of said spring means.

4. A quick action coupling according to claim 3, wherein the outer edge surface of said outwardly extending projection defines a sliding surface being in a guiding engagement with said locking sleeve.

* * * * *